Oct. 26, 1937.   P. W. HEINRICH   2,097,397
SOLDERING TORCH VALVE
Filed Oct. 12, 1936

Paul W. Heinrich
INVENTOR

Victor J. Evans & Co.
ATTORNEYS

WITNESS

Patented Oct. 26, 1937

2,097,397

UNITED STATES PATENT OFFICE 2,097,397

SOLDERING TORCH VALVE

Paul W. Heinrich, Grosse Pointe Park, Mich.

Application October 12, 1936, Serial No. 105,305

2 Claims. (Cl. 277—46)

The invention relates to a blow torch and more especially to a soldering torch or blow pipe valve.

The primary object of the invention is the provision of a torch of this character, wherein the flame for the use of the torch is had by increasing the pilot light, the latter burning at all times so that the torch is ready for instant use and in this manner the consumption of gas and air is reduced to a minimum and at the same time the necessity of an operator lighting the torch when the same is to be brought into use is avoided.

Another object of the invention is the provision of a torch of this character, wherein the structure is of novel form for the automatic shutting off of the flame of such torch with the pilot remaining lighted and in this manner eliminating the costly waste of air and gas and avoiding the increasing of the temperature within a shop during the use of the torch in summer weather.

A further object of the invention is the provision of a torch of this character, wherein the size of the flame can be regulated and also the supply of air and gas to the nozzle tip of the torch.

A still further object of the invention is the provision of a torch of this character, which is simple in construction, thoroughly reliable and efficient in its operation, compact, readily and easily handled, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
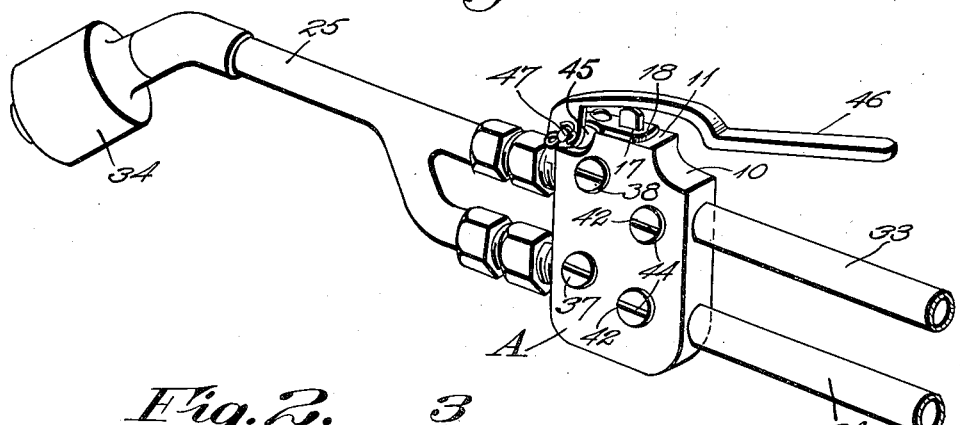
Figure 1 is a perspective view of the torch constructed in accordance with the invention.
Figure 2:
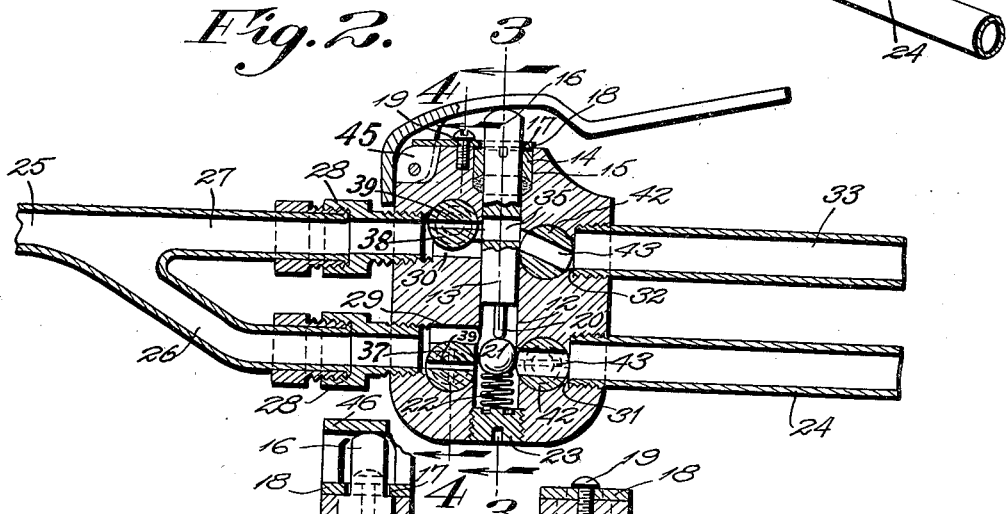
Figure 2 is a fragmentary enlarged vertical sectional view thereof.
Figures 3, 4:
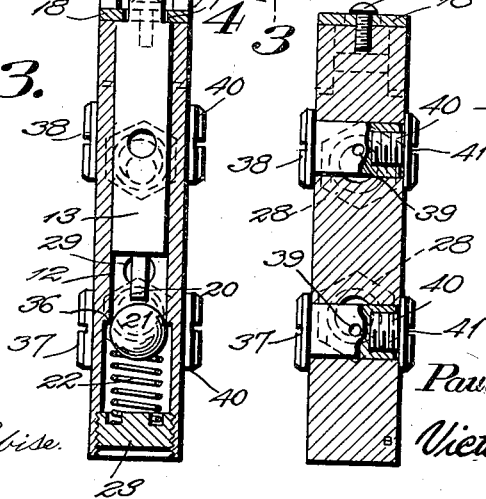
Figure 3 is a sectional view on the line 3—3 of Figure 2 looking in the direction of the arrows.
Figure 4 is a sectional view on the line 4—4 of Figure 2 looking in the direction of the arrows.

Referring to the drawing in detail, the torch comprises a block-like body A forming a valve casing, preferably of the shape shown in Figure 1 and made from brass although it may be made from any other suitable material. This block-like body A at its upper opposite corners is inset or inwardly curved at 10 and presenting at the uppermost end a flat head-like portion 11. Formed interiorly of the body A is a central longitudinal bore 12 in which is slidably fitted a plunger 13 constituting a cut-off valve, the upper end of the said plunger being embraced by a packing 14 confined within a cavity or cell 15 provided in the head portion of said body. The upper end of the plunger 13 is reduced and formed with flattened opposite sides 16, these working through a slot 17 provided in a holding plate 18 secured to the head portion by a screw 19 and in this manner the plunger 13 is prevented from rotation within the bore 12 but is free for sliding movement within said bore. Extended from the lower end of the plunger 13 is a striking pin or projection 20 adapted to operate on a ball valve 21 held within the bore 12 and beneath this valve 21 is a coiled expansion spring 22 adjustably fitted in the bore 12 through an adjusting plug 23 threaded in the lower end of said bore. This valve 21 controls the flow of gas from a tube 24 through the body A to a nozzle 25 having the branches 26 and 27, respectively. These branches 26 and 27 are attached to the body A through coupling nipples 28 for communication with passages 29 and 30, respectively, opening into the bore 12 in the body A and at one side of said bore. At the other side of the bore 12 are the passages 31 and 32, respectively, which open into said bore 12 and lead from the gas pipe 24 and an air pipe 33. The nozzle 25 carries a burner tip 34 of any conventional type and in fact the nozzle 25 is of a conventional form.

The plunger 13 has the transverse hole 35 adapted to be normally out of alignment with the passages 30 and 32 and on moving such plunger communication is established between this hole 35 and said passages for the delivery of air from the pipe 33 to the nozzle 25.

The ball 21 when seated within the bore 12 at 36 shuts off communication between the passages 29 and 31 to eliminate the flow of gas to the nozzle 25 for the production of a flame for soldering purposes of a job. When the plunger 13 is moved the pin 20 unseats the valve 21 so that communication is had between the passages 29 and 31 and the flow of gas from the pipe 24 will be had to the nozzle 25 for the production of a soldering flame.

Fitted in suitable openings therefor within the body A next to the passages 29 and 30 are turning plug screws 37 and 38, respectively, these having vents 39 therein and are rotatably held in the body A by lock bolts 40 threaded into said plug screws. The plug screw 37 by the vent 39 therein allows the flow of gas from the pipe 24 to the nozzle for effecting a pilot light when ignited while the vent 39 in the screw 38 controls the mixture of air from the pipe 33 with the gas for the pilot light.

The lock bolts have screw driver slots 41 provided therein and these align with the vents 39 transversely through said plug screws 37 and 38 so that a user of the torch can determine the position of the vents for air and gas feed for a pilot light at the tip 34 of the nozzle 25.

Located within the passages 31 and 32 are turn plug screws 42 corresponding to the screws 37 and 38 and these have vents 43 therein with which align the slots 44 similarly to the slots 41 and the purpose of these plug screws is to regulate the flow of gas and air from the pipes 24 and 33 to the nozzle 25.

Pivotally supported by an ear 45 formed on one upper inset corner 10 of the body A is a lever trigger 46, its pivot being indicated at 47 and this trigger saddles the upper end 16 of the plunger 13 so that by depressing the trigger the plunger will be operated for opening the gas and air supply to the nozzle 25 for the creation of a soldering flame at the tip 34. It will be apparent that when the pilot light exists and the plunger 13 is operated the size of the flame of the pilot light is increased to a soldering flame.

When the trigger 46 is relieved of pressure the plunger 13 under the action of the spring 22 is lifted so that the soldering flame is shut off while the pilot flame still exists.

When it is desired to extinguish the pilot light the plug 37 is manually turned for shutting off the flow of gas to the tip from the pipe 24.

The volume and size of the soldering flame is controlled or regulated by the plug screws 42 intersecting the passages 31 and 32 and having the vents 43 in said plug screws.

What is claimed is:

1. In a torch of the character described, a block-like valve body having a centrally located bore therethrough and also provided with two inlet and outlet passages on opposite sides of said bore and intersecting the same, a plunger fitting said bore, a spring tensioned ball valve seated within said bore and normally closing communication between one inlet and one outlet, a striking projection on the plunger and engaging the ball valve for unseating thereof, the plunger being provided with an opening for communication of the other inlet and outlet and normally disaligned therewith, turning plugs in the inlets to regulate the flow therethrough, turning plugs associated with the outlets and having passages for passing fluid from the inlets to the outlets when the main valves are closed, and lock bolts engaged in said plugs.

2. In a torch of the character described, a block-like valve body having a centrally located bore therethrough and also provided with two inlet and outlet passages on opposite sides of said bore and intersecting the same, a plunger fitting said bore, a spring tensioned ball valve seated within said bore and normally closing communication between one inlet and one outlet, a striking projection on the plunger and engaging the ball valve for unseating thereof, the plunger being provided with an opening for communication of the other inlet and outlet and normally disaligned therewith, turning plugs in the inlets to regulate the flow therethrough, turning plugs associated with the outlets and having passages for passing fluid from the inlets to the outlets when the main valves are closed, lock bolts engaged in said plugs, and a lever pivotally supported by the block-like body and operative against the plunger for moving the same and in turn unseating the ball valve.

PAUL W. HEINRICH.